(No Model.)
O. P. WHIPPLE.
POST AUGER.
No. 469,290. Patented Feb. 23, 1892.
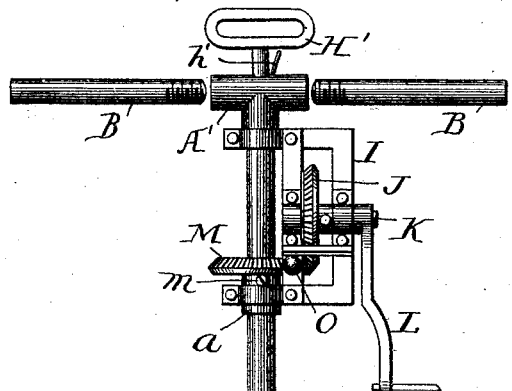
Fig. 1.
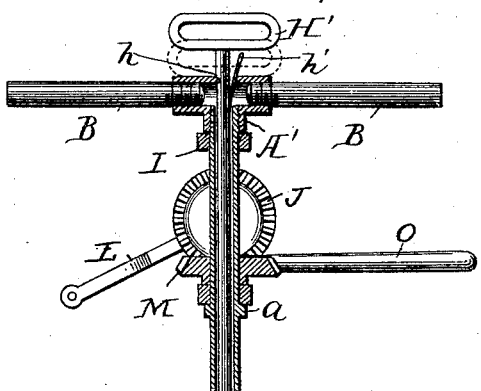
Fig. 2.
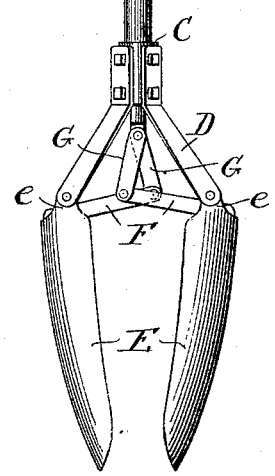
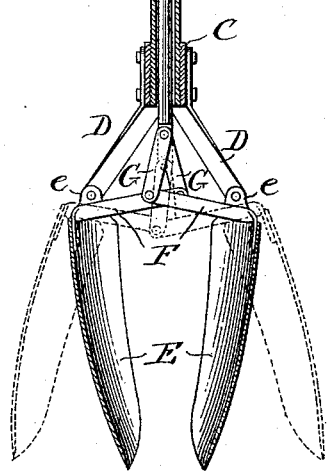
WITNESSES
INVENTOR
O. P. Whipple,
By Foster & Freeman
Attorneys.

UNITED STATES PATENT OFFICE.

ORIN P. WHIPPLE, OF COUNCIL BLUFFS, IOWA.

POST-AUGER.

SPECIFICATION forming part of Letters Patent No. 469,290, dated February 23, 1892.

Application filed May 9, 1891. Serial No. 392,226. (No model.)

*To all whom it may concern:*

Be it known that I, ORIN P. WHIPPLE, a citizen of the United States, residing at Council Bluffs, Pottawattamie county, Iowa, have invented certain new and useful Improvements in Post-Hole Augers, of which the following is a specification.

My invention relates to post-augers, and has for its object to provide a simple, cheap, and effective auger which shall be exceedingly light and strong and capable of convenient and rapid operation.

To these ends my invention consists in an auger embodying the various features of construction and having the mode of operation substantially as hereinafter more particularly set forth.

Referring to the accompanying drawings, Figure 1 is a side view of an auger embodying my invention, showing a crank-and-gear connection for rotating the auger. Fig. 2 is a longitudinal vertical section of the auger with the gear connection removed.

It will be understood that my improved device, which is primarily intended as a post-auger, may be used for other purposes for which it is adapted, the general intention being to provide a device having blades which may be adjusted in proper position and which blades may then be rotated in the earth, so as to bore or cut a proper-shaped orifice, and when the blades are practically full of earth they may be brought toward each other with sufficient force to clamp and hold the earth in position while the auger is being removed, and then the blades may be released, depositing the earth, and the operation repeated until the hole is of the proper shape and depth.

I am aware that it has heretofore been proposed to make such instruments having the general characteristics disclosed in my invention; but, so far as I am aware, no one has made such a device having the elements of simplicity, strength, and adaptibility as set forth and disclosed in my invention.

In carrying out my invention in the manner illustrated I provide a main stem A, which may be a piece of pipe a half-inch in diameter, for instance, the size of course depending upon the purposes for which the device is to be used. When this is to be operated by a handle, I attach to the upper end of the main stem a T-joint A', to which the handles B B are attached, preferably by being screwed therein, so as to be readily removable when desired. Secured to the other end of the main stem A is preferably a collar or coupling C, and to this coupling I secure in any suitable way, as by riveting or otherwise, the projections D, there being four in the present instance. These projections are shown as separate pieces; but it is evident that a tube having its end slitted and formed into the projections, which tube may be fitted directly upon the main stem, may be used; but I prefer the construction shown. Connected to these projections D are the blades E, and, while they may be connected in various ways, I preferably provide each blade with two ears $e$ at or near each edge or corner and pivot one ear to each of the projections D, as in this manner I am enabled to securely attach the blades to the projections in a manner so that they will be rigidly supported with the slightest material, and, being supported at each side, they are less liable to be displaced, twisted, or distorted in the operation of the device.

Connected to each blade, and preferably at or near the center of its top portion, is a lever F, the free end of which extends, preferably, beyond the central line of the main stem A, in order to get an increased leverage, and these free ends of the levers are connected by the links G to the end of a rod H, running through the main stem A and provided with a handle H' at the top beyond the T-joint. This rod, in connection with the links and levers, serves to operate the blades and to place them and hold them in any desired angle both for boring and for the removal and deposit of the earth, and in order that the rod may be secured to hold the blades in proper position for boring I provide in the edge of the rod H a notch $h$, which engages the edge of the T-joint. To hold this notch in position, I provide a spring, as $h'$, which normally bears upon the opposite side of the opening in the T-joint, so that when the rod is in proper position it will be held by the engagement of the notch; but when it is desired to operate the blades to grasp or release the earth, by compressing the spring the notch can be released and the handle elevated or depressed to the desired extent, and it will be seen that by the peculiar arrangement of levers and links shown very little motion of the rod is necessary to accomplish this purpose.

While in many instances it is preferable to operate the device by means of the handles B, in some cases it is desirable to provide further means for operating it where great power can be more easily applied, and to accomplish this I arrange a crank mechanism substantially such as is illustrated in Fig. 1. This mechanism, which may be detachable from the main stem, consists, essentially, of a frame I, which is made to loosely embrace the main stem, being held in position thereon between the collar $a$ and the T-joint A'. Mounted in this frame is a beveled gear J on a shaft K, to which the handle or crank L is also applied, and this beveled gear engages a similar gear M, which is adapted to be secured to the main stem A by any suitable means, as by a set-screw $m$ in the hub of the gear-wheel. In order to conveniently hold this frame-work in position, I provide a handle or steady-pin O, it being understood that when the device is operated by means of the crank the handles B B are removed from the T-joint. From this arrangement it will be seen that on turning the crank the auger will be rotated as before and that the blades can be adjusted to clamp or release the earth without in any way interfering with the gear device.

While I have shown the beveled gears J and M as being of the same size, it will be readily understood that their size may vary in order that greater power may be applied for rotating the device, or, if desired, other gear-wheels may be interposed to secure greater power; but the form shown is generally found sufficient for all purposes.

It will be observed that the device is exceedingly light, while at the same time it is strong, the metal being applied in a manner to produce the greatest effect, the parts being simple and the strength applied where necessary. Moreover, the device may be used with the cross-handles or with the gear arrangement, they being interchangeable.

What I claim is—

1. In a post-hole auger, the combination, with the hollow stem, of a sleeve secured thereto, four projecting arms extending from said sleeve, two blades having ears at their upper extremities, one ear being pivotally connected to each of the projecting arms, a lever secured to the central portion of each blade, a rod sliding in the hollow stem, and a connection between the rod and the levers, substantially as described.

2. The combination, with the main hollow stem, of a T-joint secured to one end and detachable handles secured to said T-joint, a collar mounted at the other end, projections secured to the collar, blades pivotally supported at their corners by two of the projections, a lever connected to the central portion of each blade, and a sliding rod connected by links to the levers, the said rod having a securing device for holding it in position, substantially as described.

3. A post-hole auger comprising a main hollow stem, a frame loosely mounted on the main stem, a collar on the stem supporting the frame, a bevel-wheel fixed on the stem, a bevel-wheel mounted in the frame and engaging the bevel-wheel on the stem, a crank connected to the latter bevel-wheel, a handle attached to the frame, blades connected to the main stem, and a sliding rod passing through the stem and connected to the blades, substantially as described.

In testimony whereof I have signed my name to this specification in the presence of two subscribing witnesses.

ORIN P. WHIPPLE.

Witnesses:
   J. J. FRITZ,
   P. M. PETERSEN.